June 5, 1928.                                                    1,672,019
F. H. BARBER
TIRE ATTACHMENT
Filed May 23, 1927

Inventor
Frank H. Barber
By his Attorney
G. Willard Rich.

Patented June 5, 1928.

1,672,019

UNITED STATES PATENT OFFICE.

FRANK HUTTON BARBER, OF NEW ROCHELLE, NEW YORK.

TIRE ATTACHMENT.

Application filed May 23, 1927. Serial No. 193,397.

This invention relates to that class of devices known as anti-skid tire attachments employed in connection with automobile tires to increase the traction and prevent slipping, and it has for an object the provision in such a device whereby the operation of adjusting it in position and finally securing it upon a tire may be conveniently performed by the operator from one side of the wheel without requiring him to reach over or around the tire to accurately bring together interlocking parts of a fastener located in a more or less, inconvenient position, or one in which it is difficult to view the intercovering parts.

My invention generally stated comprehends an anti-skid attachment including in conjunction with the inner and outer side pieces and the tread or cross pieces, of means permitting the elongation of one of the side pieces to facilitate placing it over a tire, which is so arranged that it may be manipulated from the opposite side of the tire to tighten said side piece and which may be secured to the other side piece and held in position, thereby when the second side piece is tightened. The invention further comprehends an arrangement of parts, whereby by means of a single locking device both the inner and outer side pieces of the attachment are permanently secured.

To these and other ends the invention consists in further improvements all as will be more fully described, the novel features being set forth in the appended claims.

In the drawings.

Similar reference numerals in the several figures represent similar parts.

In illustrating my invention I have shown the device as constructed of sections of chain as this possesses certain well known advantages but it will be understood that other flexible members may be employed with equal facility, as, for instance, stranded wire cables or belting. In carrying out my invention, I employ two side pieces 1 and 2 which are of suitable length to encircle the inner and outer sides of a pneumatic tire 3 sufficiently within its periphery to prevent them when under strain, or when a tire is partially deflated, from being dislodged by being forced over the tire. These side pieces are connected together at intervals by cross pieces 4 extending over the tread of the tire and placed sufficiently close together to provide the desired traction between its outer surface and the surface of the roadway and preferably so disposed that the meeting ends of the two side pieces are out of alinement, but it will be understood that these ends may be in alinement and equally advantageous results obtained.

Devices of this character are usually employed only in inclement weather when rain, or snow, renders street pavements slippery and dangerous to the automobile driver, or the surface of the unimproved roads becomes soft or muddy. Such road conditions often and usually occur at such times that an automobilist is required to apply his tire chains under trying circumstances which renders this work an annoying and disagreeable job. This is due in a large measure to the difficulty experienced in bringing together and securing the meeting ends of the side pieces, especially the side piece at the inner side of the tire or wheel. In order to facilitate this work, I have provided a special construction of the side pieces whereby the inner side piece can be elongated to enable it to be placed over a tire, drawn tight and secured from a point at the outer side of the tire simultaneously with the tightening of the outer side piece and both of said side pieces locked upon bringing together the meeting ends of the outer side piece.

Figure 1:
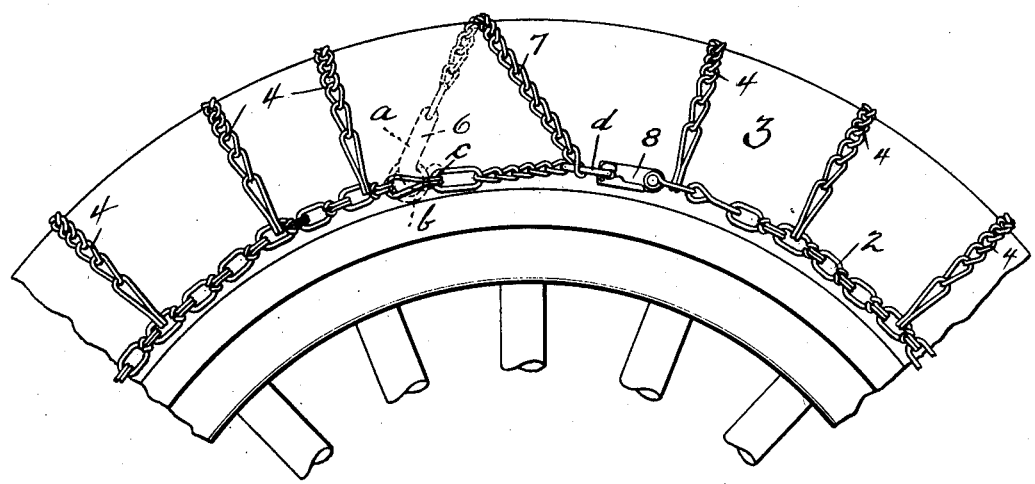
Fig. 1 is a side elevation showing a portion of the outer side of the rim on an automobile wheel having a pneumatic tire thereon and equipped with an anti-skid device embodying my invention.
Figure 3:
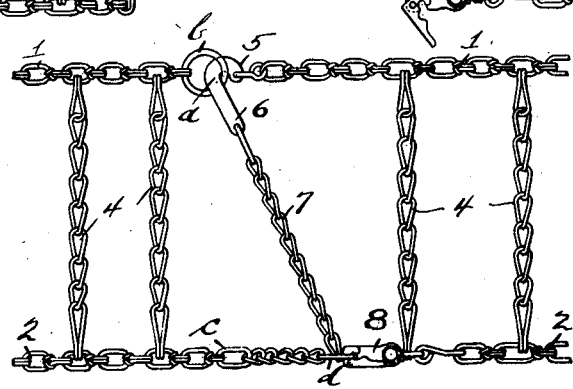
Fig. 3 is a similar view showing the parts as closed or in the position which they occupy when the attachment is secured in its operative position on a vehicle tire.

In carrying out this feature of my invention, I select the inner side piece 1 of the desired length and preferably use as a locking means for its meeting ends a tug hook $a$ and a cooperating eye or ring $b$ secured to the two extremities of said side piece. The hook $a$ is made with a short lip 5 which is pivoted to the end of the side piece, such as the end link of a chain, and a longer shank portion 6 which will pass through the eye $b$ and under strain imparted thereto acts as a lever to bring the ends of the side piece 1 together and position the eye or ring in the bite of the hook. It is of course obvious that the term "hook" which I have employed to designate the member a is equally descriptive of other forms of connecting elements which may be employed as a means for drawing together the two ends of the side piece and locking them in the manner described. The desired result may, for instance, be obtained by using a single elongated link in the chain, corresponding to the shank portion 6 and connected at its ends to the two ends of the side piece 1, since when such a link is drawn through the eye b its point of pivotal attachment, corresponding to the part 5, will be cramped in engagement with the eye to effectively lock the meeting ends of the side piece. In order to manipulate the hooking element a cross piece 7 extends over the top of the tire and is secured to the outer side piece 2. In the arrangement of the parts in which the meeting point of the ends of the outer side piece is out of alinement with the point of engagement of the meeting ends of the inner side piece, the cross piece 7 extends diagonally as shown in Figs. 1 and 3, and is connected at a point in rear of the point of engagement of the hook a in the eye b. In other words this special cross piece extends in a diagonal direction away from the eye and opposite to the direction of movement of the shank in entering the eye.

In order to coordinate the action of locking both inner and outer side pieces, I prefer to form the cross piece 7 as an extension on the end c of the outer cross piece 2, and provide therein at an intermediate point an eye d which will cooperate with a suitable form of safety fastener 8 provided in the other extremity of the outer side piece.

Figure 2:
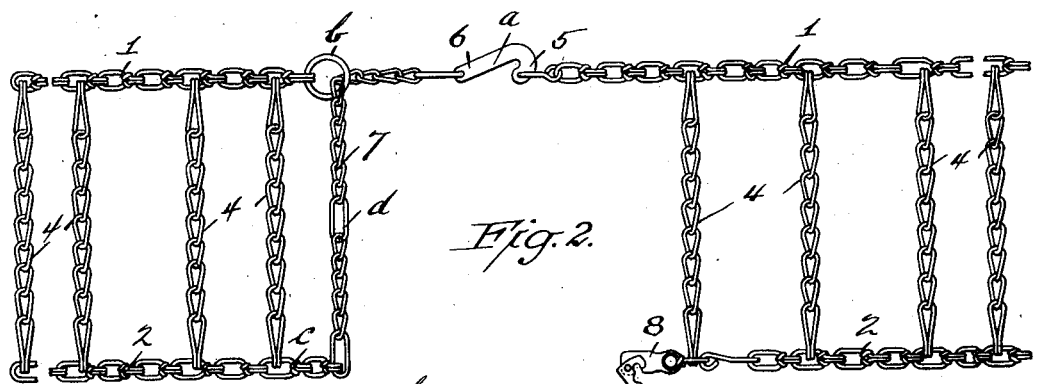
Fig. 2 is a plan view of a portion of a tire chain constructed in accordance with my invention and illustrating it in extended or open position.

In the operation of applying my antiskid device a portion of the cross piece 7 is pulled through the eye b as shown in Fig. 2, sufficient to enable the inner side piece 1 to be slipped over the top of the tire and with the disconnected portions of the side pieces lowermost with the cross pieces 4 draped over the top and sides of the tire. By movement of the vehicle sufficient to turn the wheel a partial revolution it is possible to pass the lower part of the inner side piece 1 to the inner lower side of the tire whereupon by exerting a pull on the stretch of the outer side piece connected to the hook a the inner side piece will be tightened, the shank of the hook drawn through the eye b and a locking effected between the meeting ends of the inner side piece. Coincident with this action the operator also draws the ends of the outer side piece together and places the link or eye d in the fastener 8, the several parts then occupying the position shown in Figs. 1 and 3.

The hook a need not be held firmly as it will be seen that the length of the shank permits considerable play without enabling it to be disengaged and the shape of the hook, as shown, is such that only a slight restraining action is required to be maintained on the shank to retain the hook in engagement with the eye. The cross members 4 prevent shifting of the side pieces relatively to each other and thus maintain the special cross piece 7 in its diagonal locking position.

What I claim is:—

1. A tire chain comprising side pieces of given length, a hooking element attached to one end of one side piece, an eye attached to the other end of said piece, a length of chain extending through the eye and attached at one end to the other end of said element and to one end of the other side piece and means for locking an intermediate point of said length of chain to the free end of the second side piece.

2. An anti-skid attachment for tires comprising a side piece having an eye at one end and a hook at the other, having a shank adapted to pass through the eye, a second side piece, cross pieces extending between the two side pieces, said second side piece having one end extended and attached to said shank and also forming a separate cross piece and a securing member at the other end of the second side piece and interlocking with an intermediate point on said extending end portion.

3. An anti-skid attachment for tires comprising two side pieces, a hook having a lip attached to one end of one side piece and a shank attached to the opposite end of the other side piece, an eye in the other end of the first mentioned side piece adapted to pass the shank of the hook and its connection and to receive the bite of the hook and a detachable fastener on the free end of the second side piece adapted to interlock with that portion of the latter leading from said shank in a position to both secure the second side piece and to hold the bite of the hook in engagement with the eye.

4. A tire chain comprising inner and outer side pieces encircling the sides of a tire, cross pieces connecting them, an eye at one end of the inner side piece and an extension on the corresponding end of the outer side piece of sufficient length to extend over the tread of the tire and lead through said eye, a lever-locking member attached at one end to said extension and at its opposite extremity attached to the other end of said inner side piece, and means for securing the ends of the outer side piece together and locking the said extension in a position to draw the lever through the eye and hold it in a locking position with respect to the eye.

5. A tire chain comprising inner and outer side pieces encircling the sides of a tire, cross pieces connecting them, an eye attached at one end of the inner side piece and close to the last cross piece of that end of the chain, an extension on the corresponding end of the outer side piece of sufficient length to extend over the tread of the tire and lead through said eye, a lever-locking member attached at one end to said extension and at its opposite extremity attached to the other end of said inner side piece and locking means attached at the free end of the outer side piece and close to the last cross piece of the other end of the chain, for securing the ends of the outer side piece together and locking the said extension in a position to draw the lever through the eye and hold it in a locking position with respect to the eye.

FRANK HUTTON BARBER.